US009804446B2

(12) United States Patent
Park et al.

(10) Patent No.: US 9,804,446 B2
(45) Date of Patent: Oct. 31, 2017

(54) LIQUID CRYSTAL DISPLAY

(71) Applicant: Samsung Display Co., Ltd., Yongin, Gyeonggi-Do (KR)

(72) Inventors: Eun-Kil Park, Cheonan-si (KR); Swae-Hyun Kim, Asan-si (KR); Chang Il Tae, Seoul (KR)

(73) Assignee: Samsung Display Co., Ltd. (KR)

( * ) Notice: Subject to any disclaimer, the term of this patent is extended or adjusted under 35 U.S.C. 154(b) by 96 days.

(21) Appl. No.: 14/743,255

(22) Filed: Jun. 18, 2015

(65) Prior Publication Data
US 2016/0216566 A1    Jul. 28, 2016

(30) Foreign Application Priority Data

Jan. 22, 2015  (KR) .................. 10-2015-0010584

(51) Int. Cl.
G02F 1/1343  (2006.01)
G02F 1/1337  (2006.01)

(52) U.S. Cl.
CPC .......... *G02F 1/133753* (2013.01); *G02F 2001/133761* (2013.01); *G02F 2001/134345* (2013.01)

(58) Field of Classification Search
CPC ................................ G02F 1/134309
See application file for complete search history.

(56) References Cited

U.S. PATENT DOCUMENTS

| 2006/0152659 | A1* | 7/2006 | Ishihara | G02F 1/133371 349/117 |
|---|---|---|---|---|
| 2010/0007830 | A1 | 1/2010 | Kim et al. | |
| 2011/0310342 | A1 | 12/2011 | Kim et al. | |
| 2012/0075542 | A1* | 3/2012 | Kim | G02F 1/1393 349/33 |
| 2012/0282838 | A1* | 11/2012 | Kim | G02F 1/133753 445/25 |
| 2013/0182204 | A1 | 7/2013 | Shin et al. | |
| 2013/0329168 | A1 | 12/2013 | Chung et al. | |

FOREIGN PATENT DOCUMENTS

KR  1020070031580 A  3/2007
KR  1020100055154 A  5/2010

* cited by examiner

*Primary Examiner* — Edmond Lau
(74) *Attorney, Agent, or Firm* — Innovation Counsel LLP

(57) ABSTRACT

Disclosed herein is a liquid crystal display, including: a first substrate; a first sub-pixel electrode positioned on the first substrate including a first sub-region and a second sub-region; a second sub-pixel electrode positioned on the first substrate including a third sub-region and a fourth sub-region; and an insulating layer positioned between the first sub-region of the first sub-pixel electrode and the second sub-pixel electrode, wherein liquid crystal molecules corresponding to a first region in which the second sub-region of the first sub-pixel electrode is positioned, a second region in which the first sub-region of the first sub-pixel electrode and the third sub-region of the second sub-pixel electrode overlap each other, and a third region in which the fourth sub-region of the second sub-pixel electrode is positioned are configured to have different pretilts.

14 Claims, 14 Drawing Sheets

Blue sub-pixel

Red/green sub-pixel

LIQUID CRYSTAL DISPLAY

CROSS-REFERENCE TO RELATED APPLICATION

This application claims priority to and the benefit of Korean Patent Application No. 10-2015-0010584 filed in the Korean Intellectual Property Office on Jan. 22, 2015, the entire contents of which are incorporated herein by reference.

BACKGROUND (a) Field

The present application relates to a liquid crystal display.

(b) Description of the Related Art

A liquid crystal display is one of the flat panel displays which have been most widely used currently and includes two sheets of a display panel in which field generating electrodes, such as a pixel electrode and a common electrode, are formed and a liquid crystal layer interposed therebetween.

The field generating electrodes are applied with a voltage to generate an electric field in the liquid crystal layer and an alignment of liquid crystal molecules of the liquid crystal layer is determined and polarization of incident light is controlled based on the generated electric field to display an image.

The liquid crystal display further includes switching elements connected to each of the pixel electrodes and a plurality of signal lines, such as gate lines and data lines, which control the switching elements to apply a voltage to the pixel electrodes.

Among the liquid crystal displays, a liquid crystal display in a vertically aligned mode in which major axes of the liquid crystal molecules are aligned to be vertical to the display panel has a large contrast ratio and a wide reference viewing angle, and therefore has received much attention. Herein, a reference viewing angle means a viewing angle in which a contrast ratio is 1:10 or an inter-gray luminance inversion critical angle.

Meanwhile, in the case of the liquid crystal display according to the scheme, to make side visibility approximate front visibility, a method for making transmittance different by dividing one pixel into two sub-pixels and applying different voltages to the two sub-pixels has been suggested.

However, in the case of making side visibility approximate front visibility by dividing one pixel into two sub-pixels and making transmittance different, luminance is increased at a low gray or a high gray to make it difficult to implement gray expression at the side, thereby causing the problem that an image quality deteriorates.

Further, in the case of dividing one pixel only into a plurality of physical areas, a freedom of design is reduced to make it difficult to improve additional characteristics. Therefore, a method for improving additional characteristics by controlling a pretilt angle without changing a separate design is desired.

The above information disclosed in this Background section is only for enhancement of understanding of the background and therefore it may contain information that does not form the prior art that is already known in this country to a person of ordinary skill in the art.

SUMMARY

Embodiments have been made in an effort to provide a liquid crystal display capable of making side visibility approximate front visibility and implementing an accurate color at a side.

An exemplary embodiment provides a liquid crystal display, including: a first substrate; a first sub-pixel electrode positioned on the first substrate, configured to be applied with a first voltage, and including a first sub-region and a second sub-region; a second sub-pixel electrode positioned on the first substrate, configured to be applied with a second voltage, and including a third sub-region and a fourth sub-region; an insulating layer positioned between the first sub-region of the first sub-pixel electrode and the second sub-pixel electrode; a second substrate facing the first substrate; a common electrode positioned on the second substrate and configured to be applied with a common voltage; and a liquid crystal layer positioned between the first substrate and the second substrate, wherein liquid crystal molecules corresponding to a first region in which the second sub-region of the first sub-pixel electrode is positioned, a second region in which the first sub-region of the first sub-pixel electrode and the third sub-region of the second sub-pixel electrode overlap each other, and a third region in which the fourth sub-region of the second sub-pixel electrode is positioned are configured to have different pretilts.

The pretilt of the liquid crystal molecules corresponding to the first region may have an angle larger than the pretilt of the liquid crystal molecules corresponding to the second region and the pretilt of the liquid crystal molecules corresponding to the third region.

The pretilt of the liquid crystal molecules corresponding to the second region may have an angle larger than the pretilt of the liquid crystal molecules corresponding to the third region.

A difference in the pretilt of the liquid crystal molecules corresponding to the first region, the pretilt of the liquid crystal molecules corresponding to the second region, or the pretilt of the liquid crystal molecules corresponding to the third region may be equal to or more than about 0.5°.

The difference in the pretilt of the liquid crystal molecules corresponding to the first region, the pretilt of the liquid crystal molecules corresponding to the second region, or the pretilt of the liquid crystal molecules corresponding to the third region may be equal to or more than about 15°.

A difference between the first voltage and the common voltage may be larger than a difference between the second voltage and the common voltage.

Luminance of the first region, the second region, and the third region may be configured to be different from one another.

The liquid crystal display may further include: a plurality of pixels, wherein the plurality of pixels includes a first sub-pixel, a second sub-pixel, and a third sub-pixel each configured to display red, blue, and green and the first sub-pixel, the second sub-pixel, and the third sub-pixel have different pretilt angles.

The first region of the second sub-pixel configured to display the blue may have the pretilt angle smaller than the pretilt angle of the liquid crystal molecules corresponding to the first region of the first sub-pixel configured to display the red.

The first region of the second sub-pixel configured to display the blue may have the pretilt angle smaller than the pretilt angle of the liquid crystal molecules corresponding to the first region of the third sub-pixel configured to display the green.

A difference in the pretilt angles of the liquid crystal molecules corresponding to the first region of the first sub-pixel, the second sub-pixel, and the third sub-pixel may be equal to or more than about 0.5° and may be equal to or less than about 1.5°.

In the first sub-pixel configured to display the red, the second sub-pixel configured to display the blue, and the third sub-pixel configured to display the green, the pretilt of the liquid crystal molecules corresponding to the first region of each sub-pixel may have an angle larger than the pretilt of the liquid crystal molecules corresponding to the second region of each sub-pixel and the pretilt of the liquid crystal molecules corresponding the third region and the pretilt of the liquid crystal molecules corresponding to the second region may have an angle larger than the pretilt of the liquid crystal molecules corresponding to the third region.

The difference in the pretilt of the liquid crystal molecules corresponding to the first region, the pretilt of the liquid crystal molecules corresponding to the second region, or the pretilt of the liquid crystal molecules corresponding to the third region may be equal to or more than about 0.5° and may be equal to or less than about 1.5°.

The first sub-region of the first sub-pixel electrode may have an integrated plate shape.

The first sub-pixel electrode and the second sub-pixel electrode may be physically and electrically separated from each other.

The second sub-region of the first sub-pixel electrode may be positioned on the some layer as the third sub-region and the fourth sub-region of the second sub-pixel electrode.

According to an exemplary embodiment, it is possible to provide the structure of the liquid crystal display capable of making the side visibility approximate the front visibility, implementing the accurate gray expression in the low gray area, preventing the display quality from deteriorating, and controlling the pretilt angle without changing the separate design to improve the additional characteristics.

DETAILED DESCRIPTION OF THE EMBODIMENTS

Figure 1:
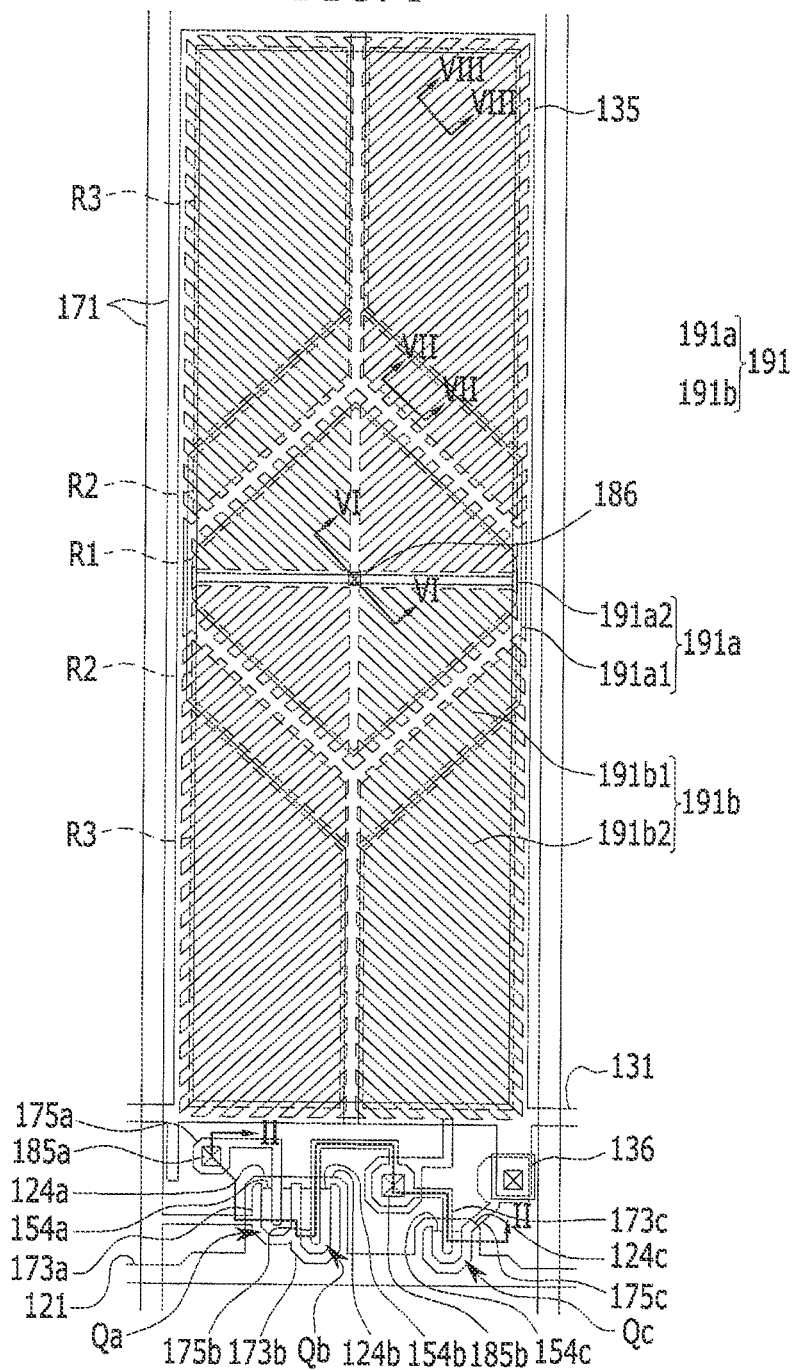
FIG. 1 is a layout view of a liquid crystal display according to an exemplary embodiment.

In the following detailed description, only certain exemplary embodiments have been shown and described, simply by way of illustration. As those skilled in the art would realize, the described embodiments may be modified in various different ways, all without departing from the spirit or scope of the inventive concept. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Figure 2:
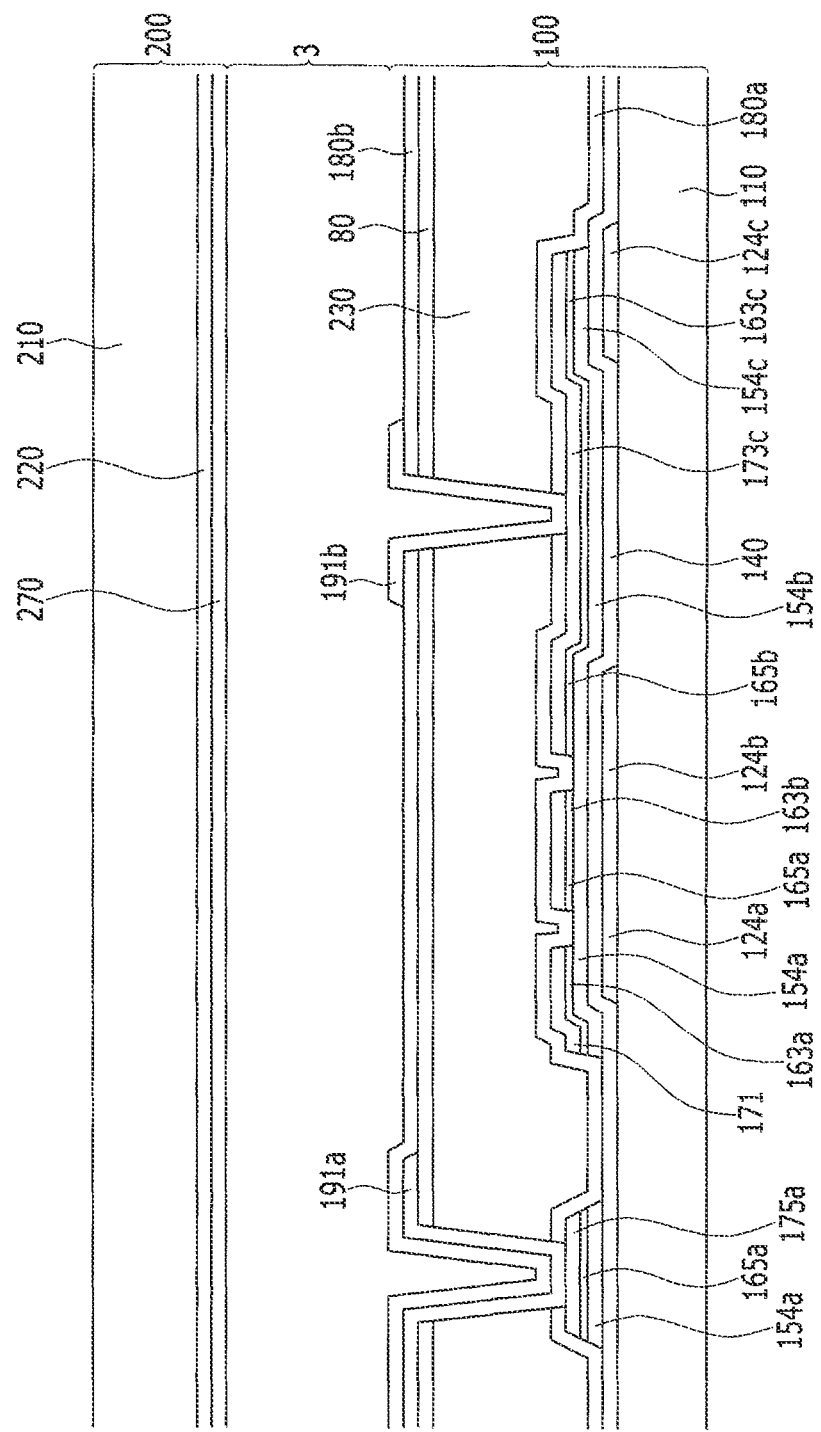
FIG. 2 is a cross-sectional view of the liquid crystal display device of FIG. 1 taken along the line II-II.
Figure 3:
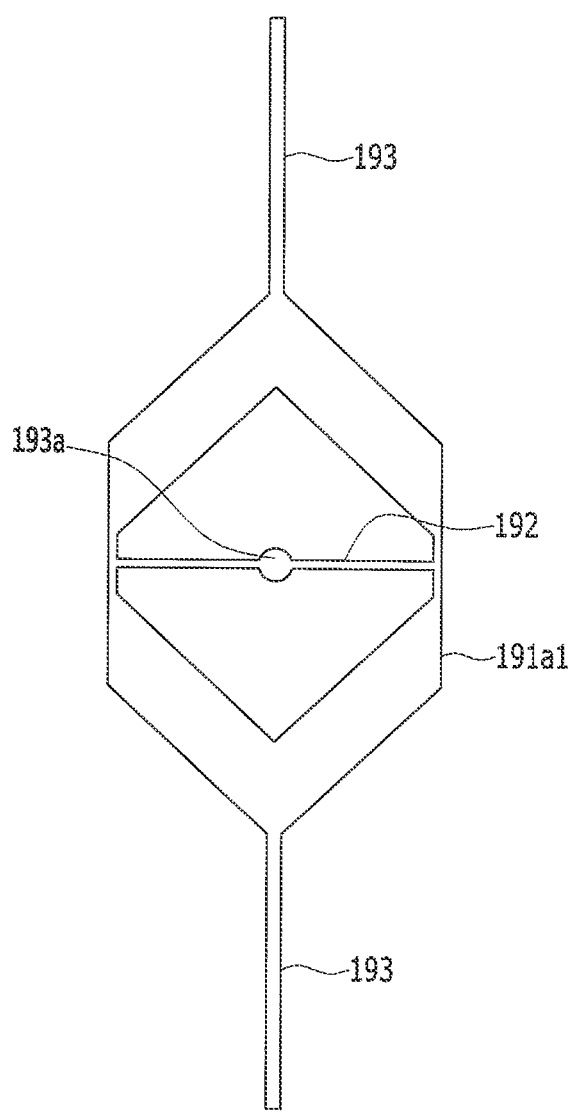
FIG. 3 is a layout view of a first portion of a first sub-pixel electrode of the liquid crystal display of FIG. 1.
Figure 4:
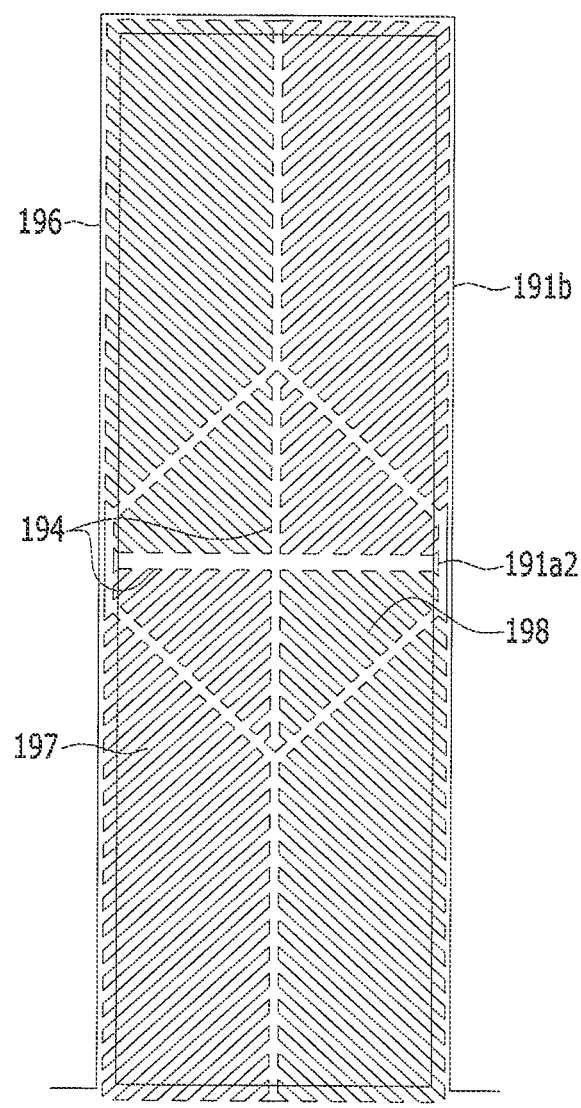
FIG. 4 is a layout view of a second portion of the first sub-pixel electrode and a second sub-pixel electrode of the liquid crystal display of FIG. 1.
Figure 5:
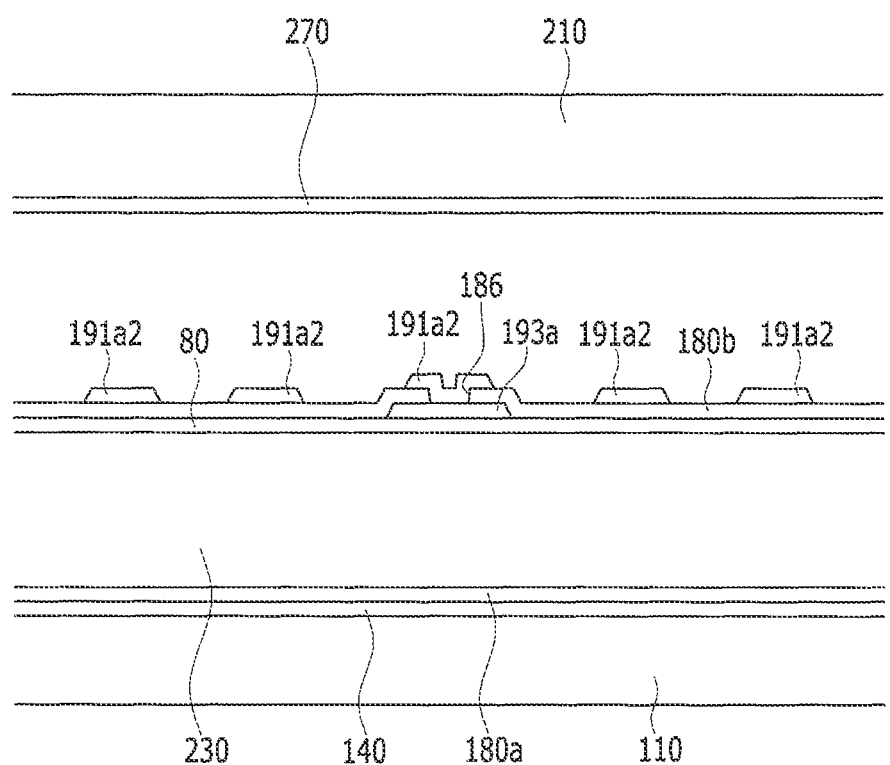
FIG. 5 is a cross-sectional view of the liquid crystal display of FIG. 1 taken along the line VI-VI.
Figure 6:
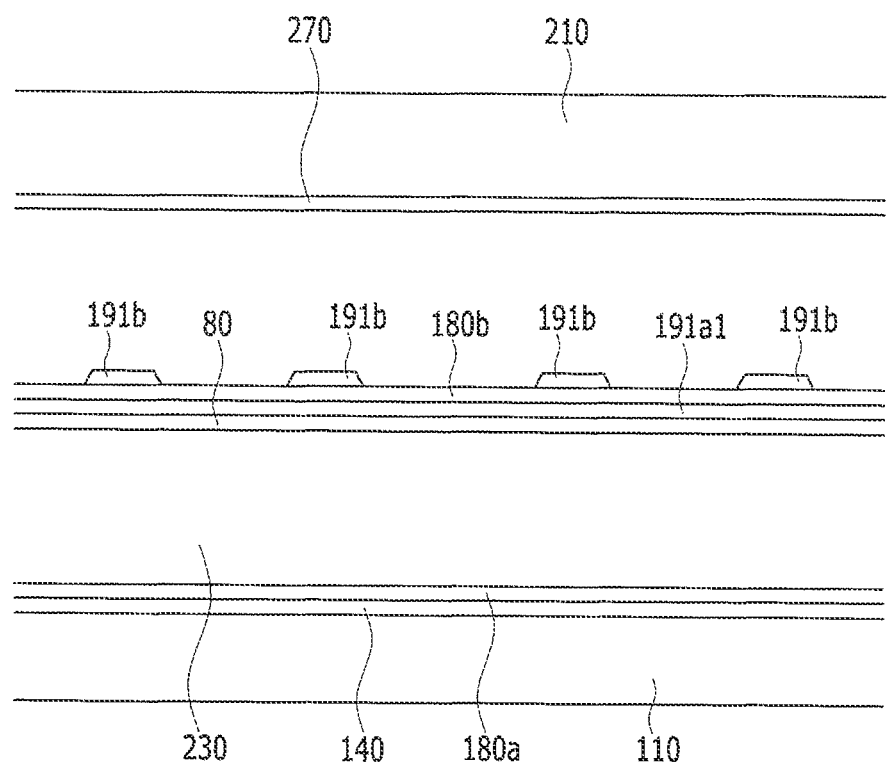
FIG. 6 is a cross-sectional view of the liquid crystal display of FIG. 1 taken along the line VII-VII.
Figure 7:
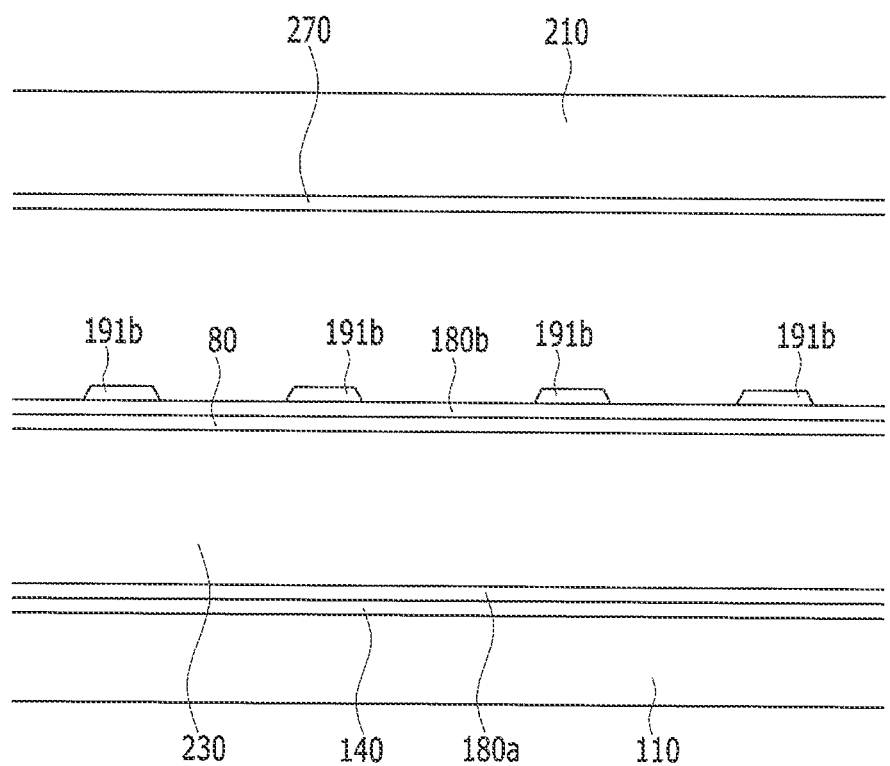
FIG. 7 is a cross-sectional view of the liquid crystal display of FIG. 1 taken along the line VIII-VIII.

Next, a liquid crystal display according to the exemplary embodiment will be described in detail with reference to FIGS. 1 to 7. FIG. 1 is a layout view of a liquid crystal display according to an exemplary embodiment. FIG. 2 is a cross-sectional view of the liquid crystal display device of FIG. 1 taken along the line II-II. FIG. 3 is a layout view of a first portion of a first sub-pixel electrode of the liquid crystal display of FIG. 1. FIG. 4 is a layout view of a second portion of the first sub-pixel electrode and a second sub-pixel electrode of the liquid crystal display of FIG. 1. FIG. 5 is a cross-sectional view of the liquid crystal display of FIG. 1 taken along the line VI-VI. FIG. 6 is a cross-sectional view of the liquid crystal display of FIG. 1 taken along the line VII-VII. FIG. 7 is a cross-sectional view of the liquid crystal display of FIG. 1 taken along the line VIII-VIII.

Referring to FIGS. 1 and 2, the liquid crystal display according to the exemplary embodiment includes the lower panel 100 and the upper panel 200 facing each other and the liquid crystal layer 3 interposed between the two display panels 100 and 200.

First, the lower display panel 100 will be described.

A gate line 121, a reference voltage line 131, and a sustain electrode 135 are formed on a first insulating substrate 110 which is made of transparent glass, plastic, or the like. The gate line 121 mainly extends in a horizontal direction to transfer a gate signal.

The gate line 121 includes a wide end (not illustrated) on as to be connected to a first gate electrode 124a a second gate electrode 124b, a third gate electrode 124c and other layers or external driving circuits.

The reference voltage line 131 may extend in parallel with the gate line 121 and has an extension 136 which is connected to a third drain electrode 175c to be described below.

The reference voltage line 131 includes the sustain electrode 135 which encloses a pixel area.

A gate insulating layer 140 is formed on the gate line 121, the reference voltage line 131, and the sustain electrode 135. A first semiconductor 154a, a second semiconductor 154b, and a third semiconductor 154c which may be made of amorphous or crystalline silicon, etc., are formed on the gate insulating layer 140.

A plurality of ohmic contacts 163a, 163b, 163c, 165a, 165b, and 165c are formed on the first, second, and third semiconductors 154a, 154b, and 154c. When the semiconductors 154a, 154b, and 154c are oxide semiconductor, the ohmic contacts may be omitted.

Data lines 171 which include a first source electrode 173a and a second source electrode 173b and data conductors 171, 173a, 173b, 173c, 175a, 175b, and 175c which include a first drain electrode 175a, a second drain electrode 175b, a third source electrode 173c, and the third drain electrode 175c are formed on the ohmic contacts 163a, 163b, 163c, 165a, 165b, and 165c and the gate insulating layer 140.

The second drain electrode 175b is connected to the third source electrode 173c.

The first gate electrode 124a, the first source electrode 173a, and the first drain electrode 175a form a first thin film transistor Qa together with the first semiconductor 154a and a channel of the first thin film transistor Qa is formed at the first semiconductor 154a between the first source electrode 173a and the first drain electrode 175a. Similarly, the second gate electrode 124b, the second source electrode 173b, and the second drain electrode 175b form a second thin film transistor Qb together with the second semiconductor 154b, the channel of the second thin film transistor Qb is formed at the second semiconductor 154b between the second source electrode 173b and the second drain electrode 175b. The third gate electrode 124c, the third source electrode 173c, and the third drain electrode 175c form a third thin film transistor Qc together with the third semiconductor 154c, and the channel of the third thin film transistor Qc is formed at the third semiconductor 154c between the third source electrode 173c and the third drain electrode 175c.

A first passivation layer 180a which may be made of an insulating material such as silicon nitride and silicon oxide is formed on the data conductors 171, 173a, 173b, 173c, 175a, 175b, and 175c and exposed portions of the semiconductors 154a, 154b, and 154c.

A color filter 230 is formed on the first passivation layer 180a.

A light blocking member 220 may be positioned in an area in which the color filter 230 is not positioned and on a portion of the color filter 230. The light blocking member 220 is referred to as a black matrix and prevents light from leaking.

The capping layer 80 is positioned on the color filter 230. The capping layer 80 prevents the color filter 230 from being lifted and suppresses pollution of the liquid crystal layer 3 due to organic materials such as a solvent introduced from the color filter 230, thereby preventing defects such as afterimage which may occur when a screen is driven.

A first sub-region 191a1 of a first sub-pixel electrode 191a is disposed on the capping layer 80.

Referring to FIG. 3, the first sub-region 191a1 of the first sub-pixel electrode 191a has a plane shape which includes a horizontal connection part 192 and four parallelograms positioned around the horizontal connection part 192 to enclose the horizontal connection part 192. Further, an extension 193a is positioned at a central portion of the horizontal connection part 192. Further, the first sub-region 191a1 includes a protrusion 193 which extends vertically from a horizontal central portion of the pixel area. As such, the first sub-region 191a1 of the first sub-pixel electrode 191a is positioned at a portion of the pixel area.

A second passivation layer 180b is formed on the capping layer 80 and the first sub-region 191a1 of the first sub-pixel electrode 191a.

A second sub-region 191a2 of the first sub-pixel electrode 191a and a second sub-pixel electrode 191b are formed on the second passivation layer 180b. A pixel electrode 191 includes the first sub-pixel electrode 191a and the second sub-pixel electrode 191b.

Referring to FIG. 4, the second sub-region 191a2 of the first sub-pixel electrode 191a is positioned at a central portion of the pixel and the whole shape thereof is a rhombus. The second sub-region 191a2 of the first sub-pixel electrode 191a includes a cruciform stem part 194 having a horizontal part and a vertical part and a plurality of first branch electrodes 198 which extend from the cruciform stem part 194. The first branch electrodes 198 extend in four directions.

The second sub-pixel electrode 191b may include an outer stem part 196 which is formed at an edge of the pixel area and a plurality of second branch electrodes 197 which extend from the outer stem part 196.

The plurality of first branch electrodes 198 and the plurality of second branch electrodes 197 extend in parallel with each other, while facing each other.

The second sub-pixel electrode 191b includes a third sub-region 191b1 overlapping the first sub-region 191a1 of the first sub-pixel electrode 191a and another fourth sub-region 191b2. The third sub-region 191b1 of the second sub-pixel electrode 191b overlaps the first sub-region 191a1 of the first sub-pixel electrode 191a, having an insulating layer, in detail, the second passivation layer 180b disposed therebetween.

A first contact hole 185a which extends to and through which a portion of the first drain electrode 175a is exposed is formed on the first passivation layer 180a and the capping layer 80. A second contact hole 185b which extends to and through which a portion of the second drain electrode 175b is exposed is formed on the first passivation layer 180a, the capping layer 80, and the second passivation layer 180b. Further, a third contact hole 186 which extends to and through which a central portion of the first sub-region 191a1 of the first sub-pixel electrode 191a is exposed is formed on the second passivation layer 180b. The first sub-region 191a1 of the first sub-pixel electrode 191a is physically and electrically connected to the first drain electrode 175a through the first contact hole 185a and the second sub-pixel electrode 191b is physically and electrically connected to the second drain electrode 175b through the second contact hole 185b. Further, the second sub-region 191a2 of the first sub-pixel electrode 191a is connected to the first sub-region 191a1 of the first sub-pixel electrode 191a through the third contact hole 186 which is formed on the second passivation layer 180b.

The first sub-pixel electrode 191a and the second sub-pixel electrode 191b are each applied with a data voltage from the first drain electrode 175a and the second drain electrode 175b, respectively, through the first contact hole 185a and the second contact hole 185b.

Next, the upper panel 200 will be described.

The light blocking member 220 and a common electrode 270 are formed on an insulating substrate 210 made of transparent glass, plastic, or the like.

However, in the case of the liquid crystal display device according to another exemplary embodiment, the light blocking member 220 may be positioned on the lower panel 100 and in the case of the liquid crystal display device according to another exemplary embodiment the color filter 230 may be positioned on the upper panel 200.

The inner sides of the display panels 100 and 200 are provided with the alignment layers (not illustrated) which may be the vertical alignment layer (not illustrated).

The polarizer (not illustrated) is disposed on the outer surfaces of the two display panels 100 and 200 and the transmission axes of the two polarizers are orthogonal to each other, in which one of the transmission axes is preferably parallel with the gate line 121. However, the polarizer may also be disposed only on the outer surface of any one of the two display panels 100 and 200.

The liquid crystal layer 3 has a negative dielectric anisotropy and the liquid crystal molecules of the liquid crystal layer 3 are aligned so that the major axes thereof are vertical to the surfaces of the two display panels 100 and 200 in the state in which no electric field is present. Therefore, incident light does not pass through the crossed polarizers but is blocked, in the state in which no electric field is present.

At least one of the liquid crystal layer 3 and an alignment layer may include a photoreactive material, in more detail, reactive mesogen.

Next, a method for driving a liquid crystal display according to an exemplary embodiment will be briefly described.

When a gate on signal is applied to the gate line 121, the gate on signal is applied to the first gate electrode 124a, the second gate electrode 124b, and the third gate electrode 124c and thus the first switching element Qa, the second switching element Qb, and the third switch element Qc are turned on. Therefore, the data voltage applied to the data line 171 is applied to the first sub-pixel electrode 191a and the second sub-pixel electrode 191b, respectively, through the first and second switching elements Qa and Qb which are turned on. In this case, the first subpixel electrode 191a and the second subpixel electrode 191b are applied with the same magnitude of voltage. However, the voltage applied to the second sub-pixel electrode 191b is divided through the third switching element Qc which is connected to the second switching element Qb in series. Therefore, the voltage applied to the second sub-pixel electrode 191b is smaller than the voltage applied to the first sub-pixel electrode 191a.

Referring again to FIG. 1, one pixel area of the liquid crystal display according to the exemplary embodiment is configured to include a first region R1 in which the second sub-region 191a2 of the first sub-pixel electrode 191a, a second region R2 in which the first sub-region 191a1 of the first sub-pixel electrode 191a and the third sub-region 191b1 of the second sub-pixel electrode 191b overlap each other, and a third region R3 in which the fourth sub-region 191b2 of the second sub-pixel electrode 191b is positioned.

The first region R1, the second region R2, and the third region R3 are configured to include each four sub-regions, by a direction in which the plurality of first branch electrodes 198 and the plurality of second branch electrodes 197 extend.

An area of the second region R2 may be two times as large as that of the first area R1 and an area of the third region R3 may be two times as large as that of the second region R2. However, an area ratio of the first region R1, the second region R2, and the third region R3 may be changed.

Next, the first region R1, the second region R2, and the third region R3 including one pixel area of the liquid crystal display according to the exemplary embodiment will be described with reference to FIGS. 5 to 7.

Referring to FIG. 5, in the first region R1 of one pixel area of the liquid crystal display according to the exemplary embodiment is positioned on the lower panel 100 and the second sub-region 191a2 of the first sub-pixel electrode 191a which is connected to the extension 193 of the first sub-region 191a1 of the first sub-pixel electrode 191a and the common electrode 270 positioned on the upper panel 200 generate an electric field. In this case, the second sub-region 191a2 of the first sub-pixel electrode 191a includes the cruciform stem part 124 and the plurality of first branch electrodes 198 which extend in four different directions. The plurality of first branch electrodes 198 may be inclined by about 40° to about 45° with respect to the gate line 121. The liquid crystal molecules of the liquid crystal layer 3 which is positioned in the first region R1 lie in four different directions, by a fringe field generated by edges of the plurality of first branch electrodes 198. In more detail, the liquid crystal molecules are inclined in a direction parallel with a length direction of the plurality of first branch electrodes 198.

Referring to FIG. 6, in the second region R2 of one pixel area of the liquid crystal display according to the exemplary embodiment, the third sub-region 191b1 of the second sub-pixel electrode 191b positioned on the lower panel 100 and the first sub-region 191a1 of the first sub-pixel electrode 191a overlap each other. The liquid crystal molecules of the liquid crystal layer 3 are aligned by an electric field which is formed between the first sub-region 191a1 of the first sub-pixel electrode 191a positioned between the plurality of second branch electrodes 197 of the third sub-region 191b1 of the second sub-pixel electrode 191b and the common electrode 270 and an electric field which is formed between the third sub-region 191b1 of the second sub-pixel electrode 191b and the first sub-region 191a1 of the first sub-pixel electrode 191a, along with the electric field which is formed between the third sub-region 191b1 of the second sub-pixel electrode 191b and the common electrode 270 of the upper display panel 200. In this case, the liquid crystal molecules are inclined in a direction parallel with a length direction of the plurality of second branch electrodes 197.

Next, referring to FIG. 7, the third region R3 of one pixel area of the liquid crystal display according to the exemplary embodiment generates an electric field, along with the fourth sub-region 191b2 of the second sub-pixel electrode 191b which is positioned on the lower panel 100 and the common electrode 270 which is positioned on the upper panel 200. In this case, the fourth sub-region 191b2 of the second sub-pixel electrode 191b includes the plurality of second branch electrodes 197. Therefore, the liquid crystal molecules are inclined in a direction parallel with the length direction of the plurality of second branch electrodes 197.

As described above, a magnitude of second voltage applied to the second sub-pixel electrode 191b is smaller than that of first voltage which is applied to the first sub-pixel electrode 191a.

Therefore, a strength of the electric field applied to the liquid crystal layer which is positioned in the first region R1 is largest and a strength of the electric field applied to the liquid crystal layer which is positioned in the third region R3 is smallest. Since an effect of the electric field of the first sub-pixel electrode 191a which is present under the second sub-pixel electrode 191b is present in the second region R2, the strength of the electric field applied to the liquid crystal layer which is positioned in the second region R2 is smaller than that of the electric field applied to the liquid crystal layer positioned in the first region R1 and is larger than the strength of the electric field applied to the liquid crystal layer positioned in the third region R3.

As such, in the liquid crystal display according to the exemplary embodiment, one pixel area is divided into the first region R1 in which the first sub-pixel electrode 191a to which a relatively higher first voltage is applied is positioned, the second region R2 in which a portion of the first sub-pixel electrode 191a and a portion of the second sub-pixel electrode 191b to which a relatively lower second voltage is applied overlap each other, having the insulating layer 180b disposed therebetween and the third region R3 in which the second sub-pixel electrode 191b to which the relatively lower second voltage is applied is positioned. Therefore, the strength of the electric field applied to the liquid crystal molecules corresponding to the first region the second region R2, the third region R3 is different and thus an inclined angle of the liquid crystal molecules is different, such that luminance of each region is different. As such, when one pixel area is divided into three regions R2, R3 having different luminance, a change in transmittance depending on gray is smoothly controlled to prevent the transmittance from being suddenly changed depending on the change in gray even in the low gray and the high gray at the side, thereby making the side visibility approximate the front visibility and accurately express the gray even in the low gray and the high gray.

Figure 8:
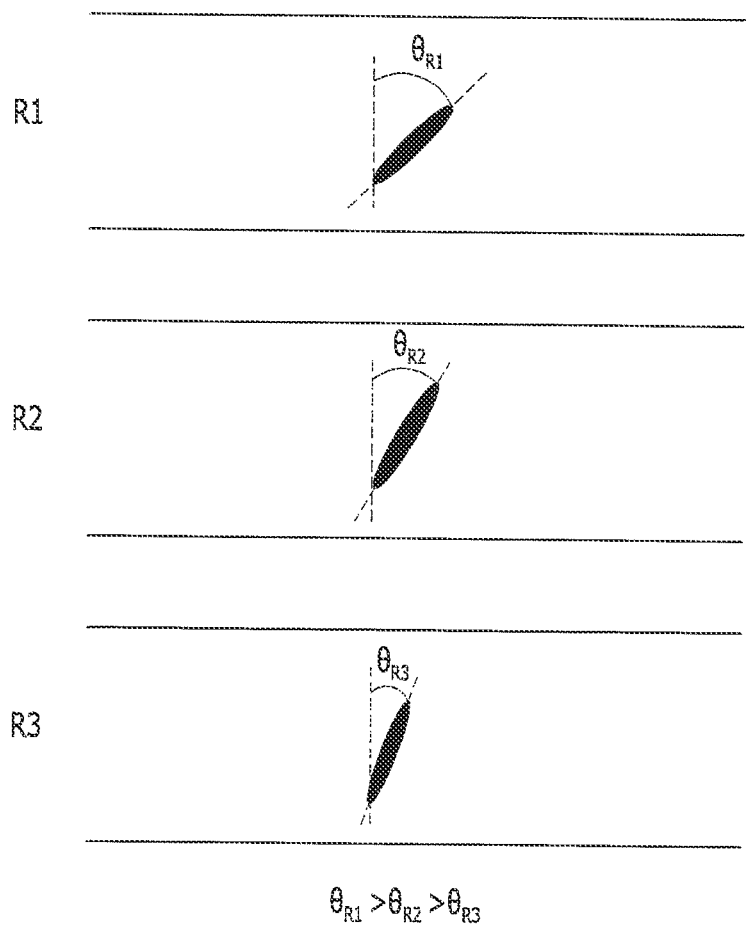
FIG. 8 is a diagram illustrating a pretilt angle of liquid crystal molecules in each area of the liquid crystal display according to the exemplary embodiment.

Further, in FIG. 1, in the liquid crystal display according to the exemplary embodiment, the liquid crystal molecules in each region R1, R2, and R3 may have different pretilt angles. In the liquid crystal display according to the exemplary embodiment, the liquid crystal molecules corresponding to the first region R1 in which the second sub-region 191a2 of the first sub-pixel electrode 191a is positioned, the second region R2 in which the first sub-region 191a1 of the first sub-pixel electrode 191a and the third sub-region 191b1 of the second sub-pixel electrode 191b overlap each other, and the third region R3 in which the fourth sub-region 191b2 of the second sub-pixel electrode 191b is positioned may have different pretilts. FIG. 8 is a diagram illustrating a pretilt angle of liquid crystal molecules in each area of the liquid crystal display according to the exemplary embodiment.

Referring to FIG. 8, in the liquid crystal display according to the exemplary embodiment, a pretilt angle $\theta_{R1}$ of the liquid crystal molecule corresponding to the first region R1 has an angle larger than a pretilt angle $\theta_{R2}$ of the liquid crystal molecule corresponding to the second region R2 and a pretilt angle $\theta_{R3}$ of the liquid crystal molecule corresponding to the third region R3. Further, the pretilt angle $\theta_{R2}$ of the liquid crystal molecule corresponding to the second region R2 has an angle larger than the pretilt angle $\theta_{R3}$ of the liquid crystal molecule corresponding to the third region R3. Here, a difference in the pretilt angle $\theta_{R1}$ of the liquid crystal molecule corresponding to the first region R1, the pretilt angle $\theta_{R2}$ of the liquid crystal molecule corresponding to the second region R2, and the pretilt angle $\theta_{R3}$ of the liquid crystal molecule corresponding to the third region R3 may be equal to or more than about 0.5° and may be equal to or less than about 1.5°.

As described above, the liquid crystal display according to the exemplary embodiment has a structure in which two pixel layers overlap each other, having the insulating layer disposed therebetween, to form a 3 division pixel. Further, the pretilt angle of the first region R1 which serves as the low gray is formed to be larger than the pretilt angles of the second region R2 and the third region R3 to make a curve of transmittance to voltage of a liquid crystal steep and reduce a side leakage amount, thereby additionally improving visibility characteristics.

Figure 9A:
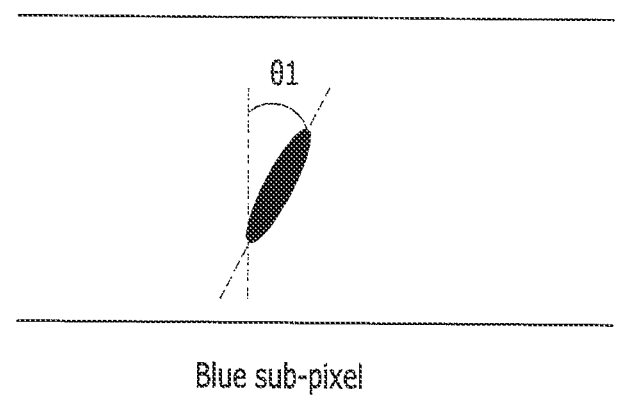
FIGS. 9A and 9B are diagrams illustrating a pretilt angle of a first region for each sub-pixel according to an exemplary embodiment.
Figure 9B:
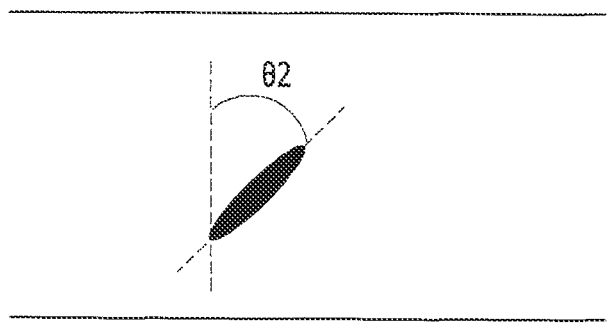

FIGS. 9A and 9B are diagrams illustrating a pretilt angle of a first region for each sub-pixel according to an exemplary embodiment.

Referring to FIGS. 9A and 9B, the liquid crystal display according to an exemplary embodiment includes the plurality of pixels. Further, each pixel includes sub-pixels each displaying red (R), green (G), and blue (B). Further, the first regions of each sub-pixels may have different pretilt angles.

For example, in the liquid crystal display according to the exemplary embodiment, a pretilt angle $\theta 1$ of the liquid crystal molecule of the first region of the sub-pixel displaying blue may be smaller than a pretilt angle $\theta 2$ of the liquid crystal molecule of the first region of the sub-pixel displaying green. Further, the pretilt angle of the liquid crystal molecule corresponding to the first region of the sub-pixel displaying red may be formed to be equal to or similar to the pretilt angle of the liquid crystal molecule of the first region of the sub-pixel displaying green.

Further, the difference between the pretilt angle of the liquid crystal molecule corresponding to the first region of the sub-pixel displaying blue and the pretilt angle of the liquid crystal molecule corresponding to the first region of the sub-pixels each displaying red or green may be equal to or more than about 0.5° and may be equal to or less than about 1.5°.

As described above, in the liquid crystal display according to the exemplary embodiment, different pretilt angles for each RGB sub-pixel are formed. The existing liquid crystal display has a front magentish phenomenon at the time of ACC off to adjust blue gamma based on ACC tuning, in terms of vertical alignment (VA) liquid crystal characteristics This reduces side blue luminance in the low gray and the intermediate gray after the tuning, thereby causing side yellowish badness.

Therefore, the liquid crystal display according to the exemplary embodiment, the pretilt angle of the sub-pixel displaying blue is formed to be smaller than the sub-pixel displaying red and the sub-pixel displaying green to reduce the side light leakage and minimize the front transmittance loss, thereby improving the side yellowish badness.

As such, the liquid crystal display according to the exemplary embodiment has a structure in which the pretilt angle of the pixel electrode is controlled without changing a separate design to form the differential pretilts for each pixel electrode so as to improve intermediate gray bump, high gray wash out and color shift which occur in the vertical alignment (VA) liquid crystal structure.

Figure 10:
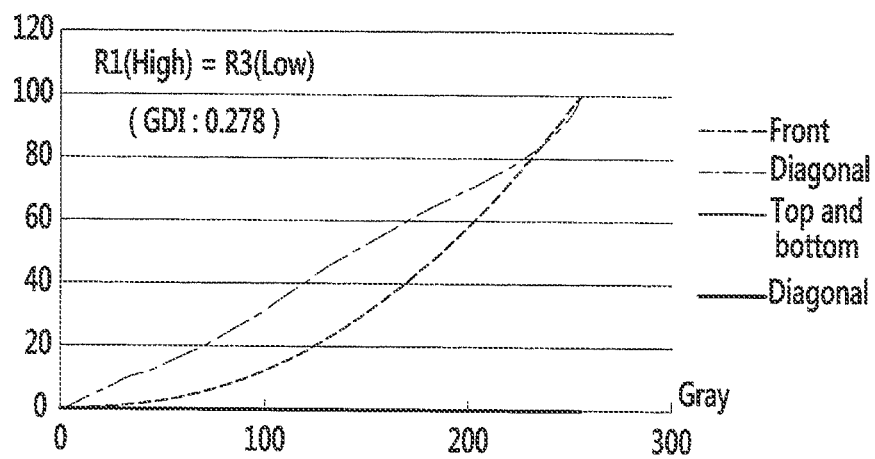
FIG. 10 is a graph illustrating transmittance to gray of the liquid display device according to the exemplary embodiment.
Figure 10:
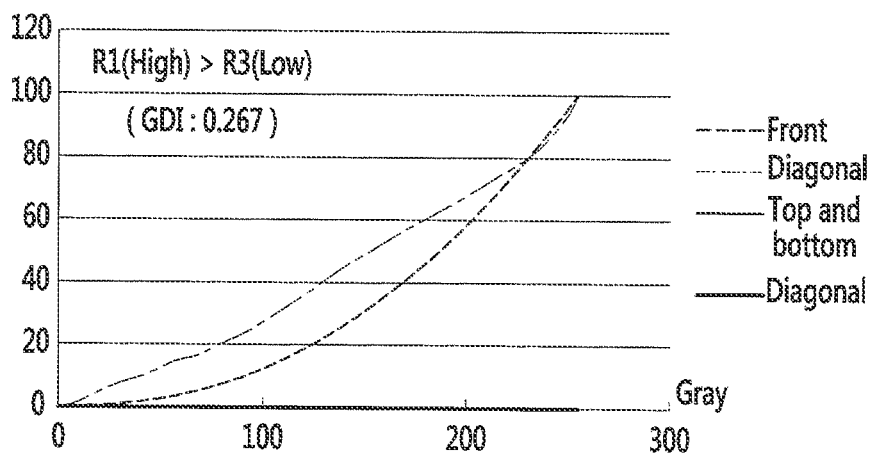
Figure 11:
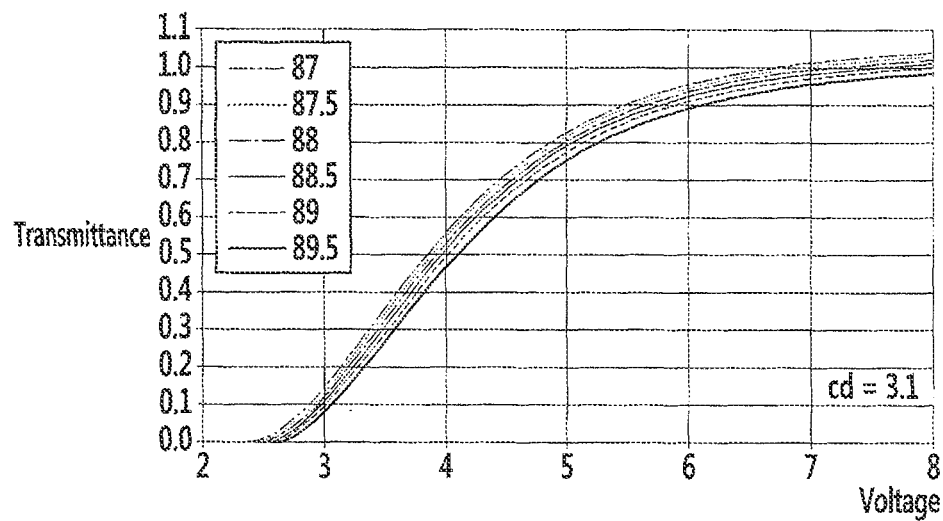
FIG. 11 is a graph illustrating transmittance to applied voltage of the liquid display device according to the exemplary embodiment.
Figure 11:
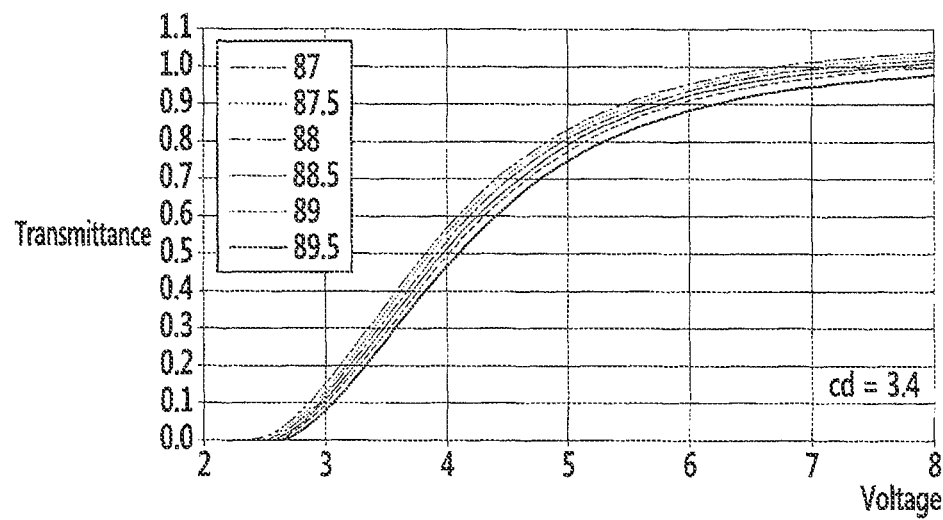

FIG. 10 is a graph illustrating transmittance to gray of the liquid display device according to the exemplary embodiment and FIG. 11 is a graph illustrating transmittance to applied voltage of the liquid display device according to the exemplary embodiment.

Referring to FIGS. 10 and 11, the liquid crystal display according to the exemplary embodiment shows the effect that the low gray area side gamma is sunk when steepness of transmittance to voltage of the first region R1 (high) is more increased than that of the third region (low) to improve a level as much as about 0.01 based on a gamma distortion index (GDI). Further, in the liquid crystal display according to the exemplary embodiment, as illustrated in FIG. 11, as the pretilt is changed from 89.5° to 87°, a curved line of transmittance to voltage moves to the left, such that a slope is increased. In the liquid crystal display according to the exemplary embodiment, the lower the low gray gamma and the higher the high gray gamma, the higher the value is calculated and a method for evaluating side visibility is improved.

Figure 12:
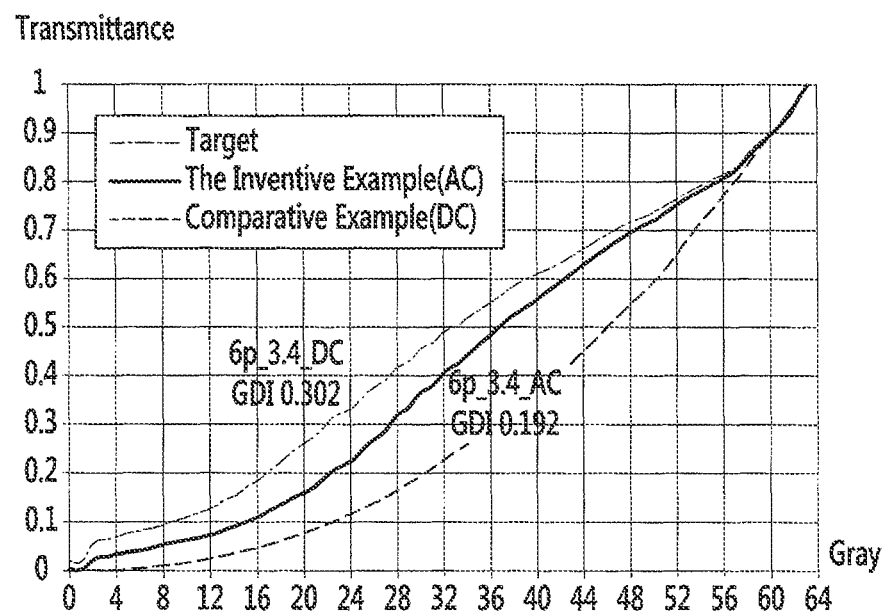
FIG. 12 is a graph illustrating transmittance to gray of the liquid display device according to the Inventive Example and Comparative Example.
Figure 13:
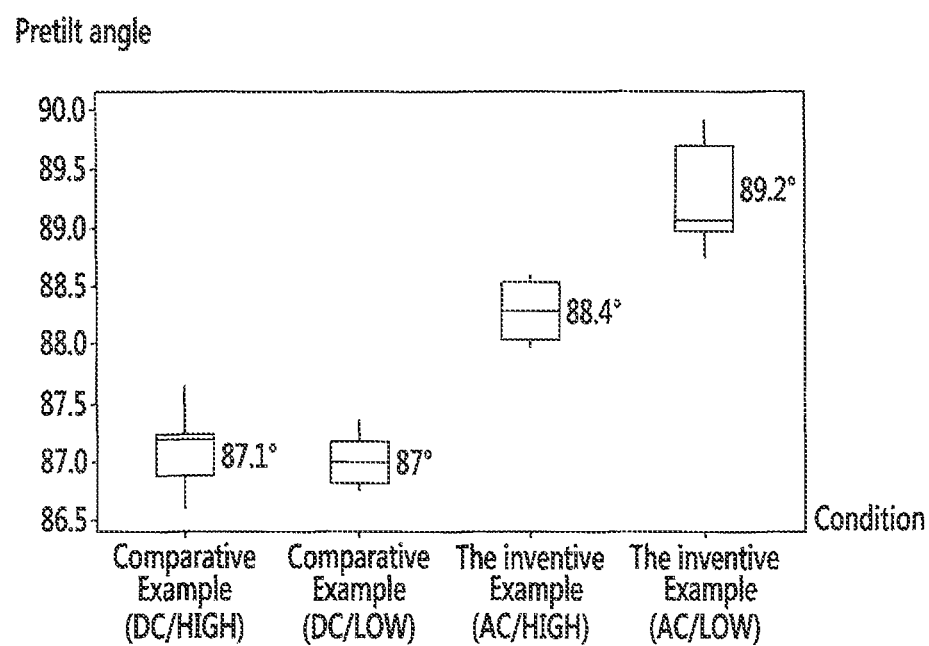
FIG. 13 is a graph illustrating a pretilt angle to a condition of the liquid display device according to the Inventive Example and Comparative Example.

FIG. 12 is a graph illustrating transmittance to gray of the liquid display device according to the Inventive Example and Comparative Example and FIG. 13 is a graph illustrating a pretilt angle to a condition of the liquid display device according to the Inventive Example and Comparative Example.

Referring to FIGS. 12 and 13, in the case of Comparative Example (−87°) in which the high and low pretilts are identical, the side visibility is not improved to a level of 0.302 based on the GDI. However, the liquid crystal display according to the exemplary embodiment shows an effect that when the high and low pretilts are formed differently (e.g., high is 88.4° and low is 89.2°, and therefore there is a difference of 0.8°), more excellent characteristics than a target are secured as a level of 0.192 based on the GDI.

As described above, the liquid crystal display according to the exemplary embodiment has a structure in which it is possible to implement the accurate gray expression in the low gray area while making the side visibility approximate the front visibility and prevent the display quality from deteriorating.

Further, the liquid crystal display according to the exemplary embodiment has a structure in which the pretilt angle of the pixel electrode is controlled without changing a separate design to form the differential pretilts for each pixel electrode so as to improve intermediate gray bump, high gray wash out, and color shift which occur in the vertical alignment (VA) liquid crystal structure.

The foregoing exemplary embodiments are not implemented only by an apparatus and a method and therefore, may be realized by programs realizing functions corresponding to the configuration of the exemplary embodiment or recording media on which the programs are recorded While the inventive concept has been described in connection with what is presently considered to be practical exemplary embodiments, it is to be understood that the inventive concept is not limited to the disclosed embodiments, but on the contrary, is intended to cover various modifications and equivalent arrangements included within the spirit and scope of the appended claims.

What is claimed is:

1. A liquid crystal display, comprising:
a first substrate;
a first sub-pixel electrode positioned on the first substrate, configured to be applied with a first voltage, and including a first sub-region and a second sub-region;
a second sub-pixel electrode positioned on the first substrate, configured to be applied with a second voltage, and including a third sub-region and a fourth sub-region;
an insulating layer positioned between the first sub-region of the first sub-pixel electrode and the second sub-pixel electrode;
a second substrate facing the first substrate;
a common electrode positioned on the second substrate and configured to be applied with a common voltage; and
a liquid crystal layer positioned between the first substrate and the second substrate,
wherein liquid crystal molecules corresponding to a first region in which the second sub-region of the first sub-pixel electrode is positioned, a second region in which the first sub-region of the first sub-pixel electrode and the third sub-region of the second sub-pixel electrode overlap each other, and a third region in which the fourth sub-region of the second sub-pixel electrode is positioned are configured to have different pretilts, and wherein the pretilt of the liquid crystal molecules corresponding to the first region has an angle larger than the pretilt of the liquid crystal molecules corresponding to the second region and the pretilt of the liquid crystal molecules corresponding to the third region.

2. The liquid crystal display of claim 1, wherein:
the pretilt of the liquid crystal molecules corresponding to the second region has an angle larger than the pretilt of the liquid crystal molecules corresponding to the third region.

3. The liquid crystal display of claim 2, wherein:
a difference in the pretilt of the liquid crystal molecules corresponding to the first region, the pretilt of the liquid crystal molecules corresponding to the second region, or the pretilt of the liquid crystal molecules corresponding to the third region is equal to or more than about 0.5°.

4. The liquid crystal display of claim 3, wherein:
the difference in the pretilt of the liquid crystal molecules corresponding to the first region, the pretilt of the liquid crystal molecules corresponding to the second region, or the pretilt of the liquid crystal molecules corresponding to the third region is equal to or more than about 1.5°.

5. The liquid crystal display of claim 4, wherein:
a difference between the first voltage and the common voltage is larger than a difference between the second voltage and the common voltage.

6. The liquid crystal display of claim 4, wherein:
luminance of the first region, luminance of the second region, and luminance of the third region are configured to be different from one another.

7. The liquid crystal display of claim 1, wherein:
the first sub-region of the first sub-pixel electrode has an integrated plate shape.

8. The liquid crystal display of claim 1, wherein:
the first sub-pixel electrode and the second sub-pixel electrode are physically and electrically separated from each other.

9. The liquid crystal display of claim 8, wherein:
the second sub-region of the first sub-pixel electrode is positioned on the same layer as the third sub-region and the fourth sub-region of the second sub-pixel electrode.

10. A liquid crystal display, comprising:
a first substrate;
a first sub-pixel electrode positioned on the first substrate, configured to be applied with a first voltage, and including a first sub-region and a second sub-region;
a second sub-pixel electrode positioned on the first substrate, configured to be applied with a second voltage, and including a third sub-region and a fourth sub-region;
an insulating layer positioned between the first sub-region of the first sub-pixel electrode and the second sub-pixel electrode;
a second substrate facing the first substrate;
a common electrode positioned on the second substrate and configured to be applied with a common voltage;
a liquid crystal layer positioned between the first substrate and the second substrate,
wherein liquid crystal molecules corresponding to a first region in which the second sub-region of the first sub-pixel electrode is positioned, a second region in which the first sub-region of the first sub-pixel electrode and the third sub-region of the second sub-pixel electrode overlap each other, and a third region in which the fourth sub-region of the second sub-pixel electrode is positioned are configured to have different pretilts; and a plurality of pixels, wherein the plurality of pixels include a first sub-pixel, a second sub-pixel, and a third sub-pixel each configured to display red, blue, and green and the first sub-pixel, the second sub-pixel, and the third sub-pixel have different pretilt angles, wherein:

a difference in the pretilt angles of the liquid crystal molecules corresponding to the first region of the first sub-pixel, the second sub-pixel, and the third sub-pixel is equal to or more than about 0.5° and is equal to or less than about 1.5°.

11. The liquid crystal display of claim 10, wherein:

the first region of the second sub-pixel configured to display the blue has the pretilt angle smaller than the pretilt angle of the liquid crystal molecules corresponding to the first region of the first sub-pixel configured to display the red.

12. The liquid crystal display of claim 11, wherein:

the first region of the second sub-pixel configured to display the blue has the pretilt angle smaller than the pretilt angle of the liquid crystal molecules corresponding to the first region of the third sub-pixel configured to display the green.

13. The liquid crystal display of claim 10, wherein:

in the first sub-pixel configured to display the red, the second sub-pixel configured to display the blue, and the third sub-pixel configured to display the green, the pretilt of the liquid crystal molecules corresponding to the first region of each sub-pixel has an angle larger than the pretilt of the liquid crystal molecules corresponding to the second region of each sub-pixel and the pretilt of the liquid crystal molecules corresponding to the third region, and the pretilt of the liquid crystal molecules corresponding to the second region has an angle larger than the pretilt of the liquid crystal molecules corresponding to the third region.

14. The liquid crystal display of claim 13, wherein:

the difference in the pretilt of the liquid crystal molecules corresponding to the first region, the pretilt of the liquid crystal molecules corresponding to the second region, or the pretilt of the liquid crystal molecules corresponding to the third region is equal to or more than about 0.5° and is equal to or less than about 1.5°.

* * * * *